UNITED STATES PATENT OFFICE.

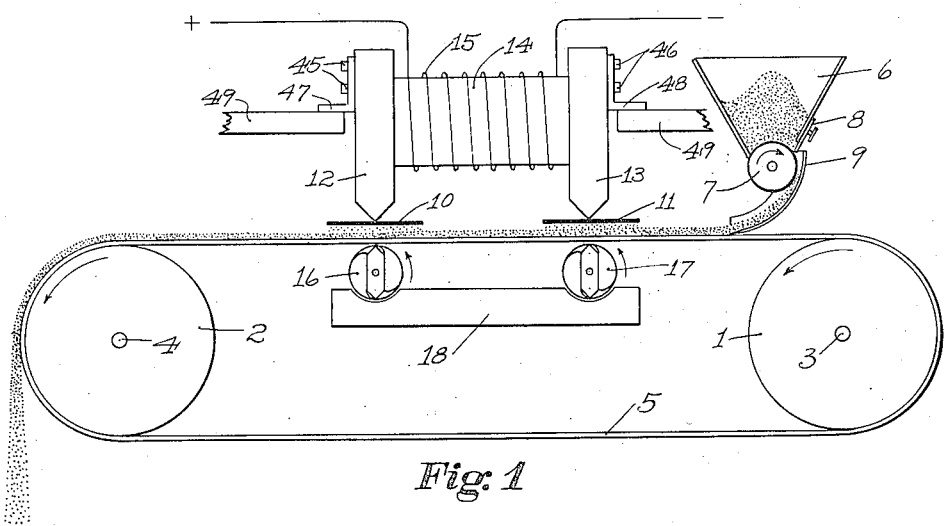
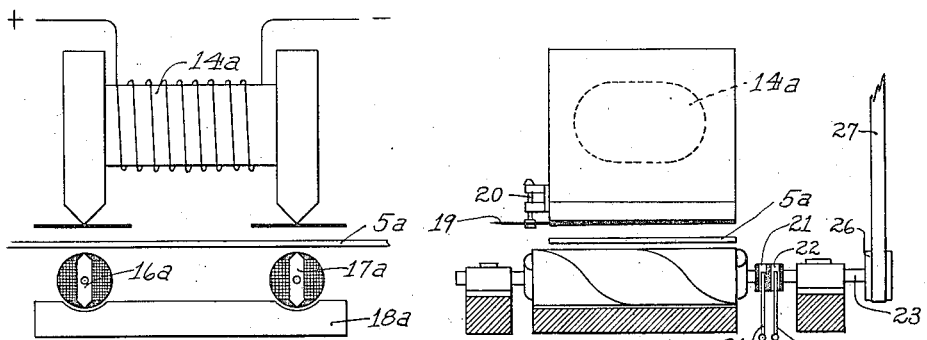
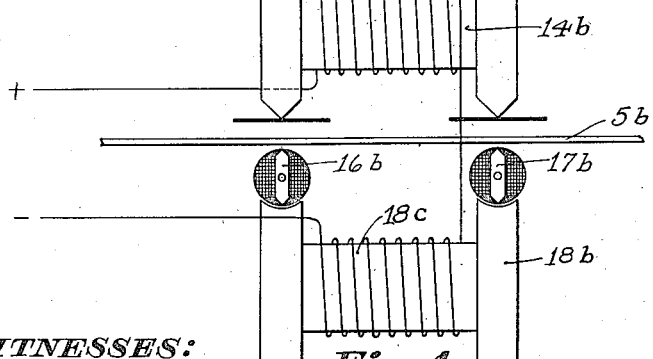

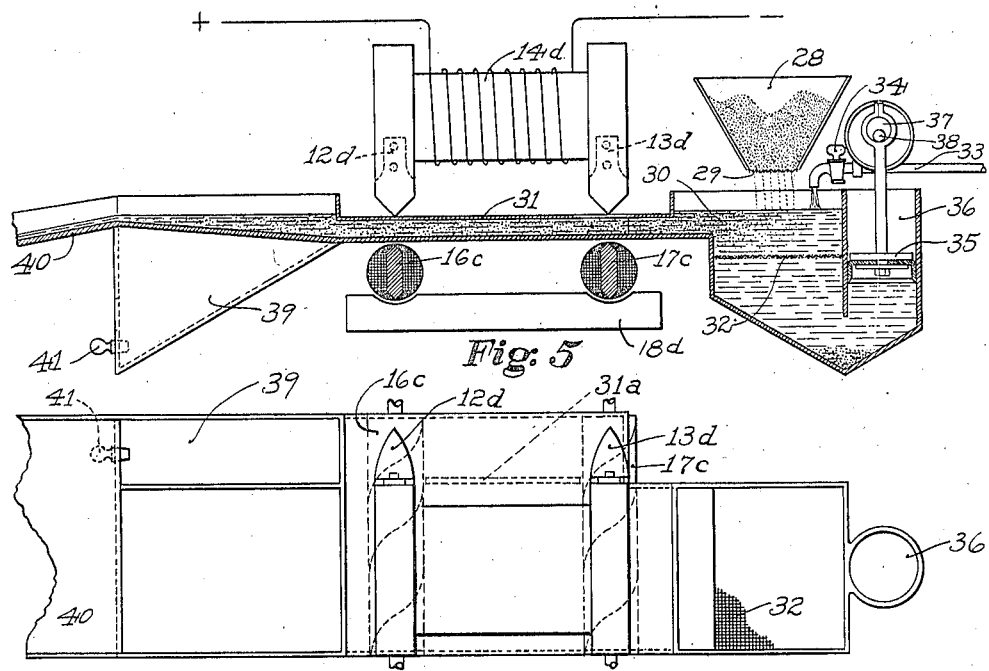
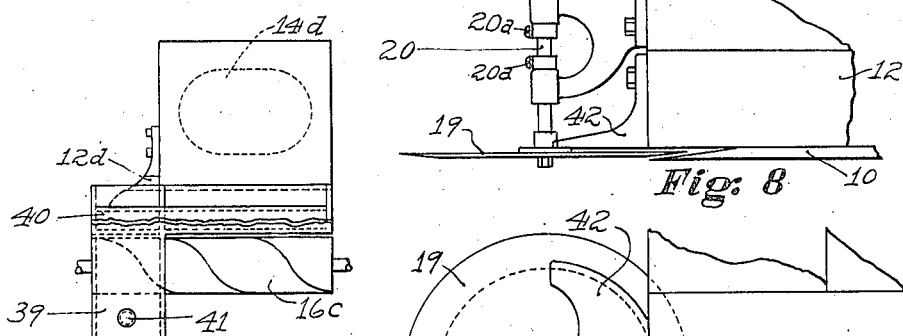

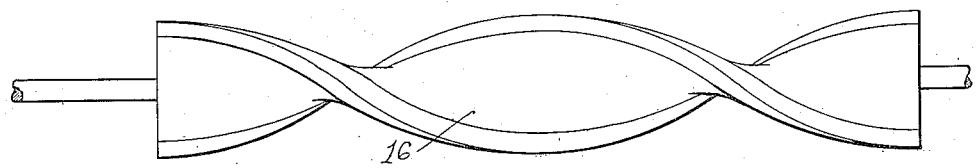
Fig. 10
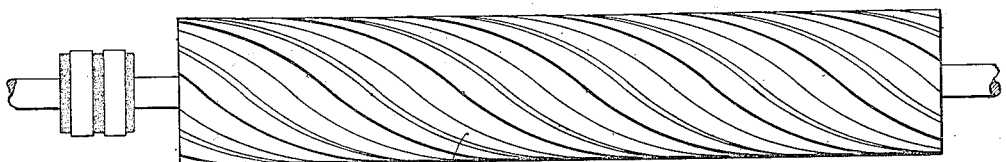
Fig. 11
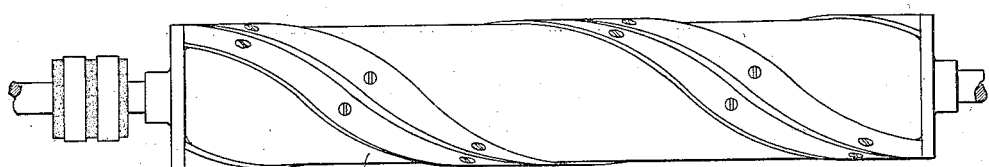
Fig. 12
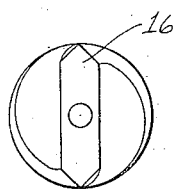   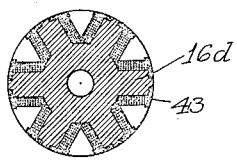   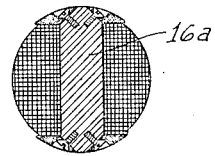
Fig. 13     Fig. 14     Fig. 15
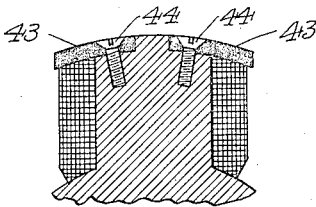
Fig. 16

SAMUEL W. OSGOOD, OF CHICAGO, ILLINOIS.

MEANS FOR EFFECTING MAGNETIC OR INDUCTIVE SEPARATION OF SUBSTANCES.

1,214,817. Specification of Letters Patent. Patented Feb. 6, 1917.

Application filed September 18, 1911, Serial No. 649,950. Renewed June 30, 1916. Serial No. 106,956.

*To all whom it may concern:*

Be it known that I, SAMUEL W. OSGOOD, a citizen of the United States, residing at Chicago, in the county of Cook and State of Illinois, have invented certain new and useful Improvements in Means for Effecting Magnetic or Inductive Separation of Substances, of which the following is a full, clear, concise, and exact description, reference being had to the accompanying drawings, forming a part of this specification.

By my invention I provide a means by which substances, either magnetic or conductive, may be separated from non-magnetic or non-conductive substances by the action of moving magnetic fields which differently affect substances of one class from those of another, as a result of which the substances most affected are caused to travel with the magnetic fields away from the remaining substances.

By my invention I also provide a means for separating the magnetic substances from the conductive substances, the degree of susceptibility either to magnetic or inductive action being employed to determine the substances removed from the mass by the separator.

By my invention the moving magnetic fields employed are produced by direct currents without the use of expensive and complicated commutating means, the magnets being in each case of a construction adapted to be energized by direct currents. In this way I avoid the difficulties incident to the use of alternating current magnets and eliminate a large part of the expense necessarily involved in an installation for producing alternating currents. The magnetic field or fields being so produced as to move relatively to the substances to be treated, may be given any desired rate of motion without in any way interfering with the electrical circuits involved, and thus the magnetic particles will be separated by the direct action of the magnetic field and moved with it away from the mass of the substances treated, while the conductive substances will have induced in them electric currents which will cause motion of the conductive particles due to the magnetic field in which they are located, the motion of the field also serving to move the conductive particles from the mass of the substances being treated. In this way, the magnetic particles may be removed from the non-magnetic or less magnetic particles and the diamagnetic particles may be similarly removed from the para-magnetic particles owing to the opposite effects upon these particles of the magnetic fields, and the inductive particles may be similarly removed from the magnetic particles.

In carrying out my invention I provide a conveyer for moving the mass of particles to be treated in a direction across the direction of motion of the magnetic field or fields used to separate the desired particles from the mass, and in this way the magnetic field or fields separate the magnetic and inductive particles from the mass being treated and remove such magnetic and inductive particles from the machine into suitable receptacles for receiving the same, the remaining portion of the mass treated being delivered by the conveyer to a separate receptacle. The essential requirement of my invention is that the magnetic field employed be given an undulatory or wave-like motion of progression in a direction different from the direction of travel of the mass of substances being treated. The effect of the moving magnetic field is to thoroughly agitate the particles being treated, which are fed to the conveyer in finely crushed condition, and as a result the separation of the magnetic and inductive particles from the non-affected or less affected remaining portion is completely effected.

The separation described may be carried out either in the air, or in an atmosphere of any desired gas, or with the substances treated immersed in any desired liquid, depending upon the nature of the substances treated and the separation desired.

In carrying out my invention I find it advantageous to employ a magnetic armature or armatures disposed transversely of the conveyer, which armatures are provided with helically disposed poles, as a result of which when the armatures are rotated the magnetic fields of force produced by the poles through the substances carried by the conveyer move through the substances longitudinally of the armature or armatures and transversely of the conveyer. The magnetic circuits employed and the apparatus used to produce the moving magnetic fields may be variously designed and the forms I have found best suited to the successful carrying out of my invention are illustrated in the following drawings, in which—

Figure 1 is a side view showing diagrammatically an arrangement of conveyer and an electromagnet having fixed poles extending transversely of the conveyer coöperating with helically formed armatures below the conveyer; Fig. 2 shows an arrangement of electromagnetic mechanism similar to Fig. 1 with the exception that the armatures are provided with energizing windings; Fig. 3 is an end view of the parts shown in Fig. 2 and illustrates the manner of supplying current to one of the armatures and the means employed for rotating the armature; Fig. 4 shows an arrangement of electromagnetic mechanism similar to Fig. 2 with the exception that the keeper or return path for the two revoluble armatures is replaced by a second electromagnet; Fig. 5 shows in a view similar to Fig. 1 a modified construction of apparatus by which the substances treated may be suspended in a desired liquid during the treating operation; Figs. 6 and 7 are top and end views, respectively, of the parts shown in Fig. 5; Fig. 8 is a detail end view of one of the electromagnets showing a construction which may be employed for removing the separated particles from the field of action of the electromagnet; Fig. 9 is a top view of the parts shown in Fig. 8; Figs. 10, 11 and 12 are detail side views of different forms of armature construction, the form shown in Fig. 10 being a plain unwound armature, while the forms shown in Figs. 11 and 12 are wound; Figs. 13, 14 and 15 are cross-sectional views taken transversely through the armatures of Figs. 10, 11 and 12, respectively; and Fig. 16 shows in an enlarged view similar to Fig. 14 one of the poles of the armature shown in Figs. 11 and 14 for the purpose of indicating the manner of securing the windings in place.

Similar numerals refer to similar parts throughout the several views.

As shown in Fig. 1, the mechanism diagrammatically illustrated comprises a pair of wheels or rollers 1 and 2 mounted upon shafts 3 and 4, respectively, around which wheels or rollers an endless conveyer 5 is disposed. Motion is imparted to the wheels and conveyer in the direction indicated by the arrows by any suitable driving means (not shown) applied to one or both of the shafts 3 and 4. A hopper 6 is disposed above the top of the conveyer 5 and in the bottom of the hopper is located a revoluble cylinder 7, which is caused to rotate in the direction indicated by the arrow. An adjustable gate 8 is provided in one of the lower walls of the hopper 6 to provide a discharge opening from the hopper of a desired amount. The pulverized ore to be treated is placed in the hopper 6 and caused by the cylinder 7 to pass through the opening below the gate 8 into the receiving chute or spout 9, which delivers the material onto the top of the conveyer 5. The conveyer by its motion in the direction indicated carries the material below shields 10 and 11 of non-conducting material secured to the lower beveled edges of the poles 12 and 13, respectively, of an electromagnet 14. The electromagnet 14 is provided with a winding 15 adapted to be energized by direct current flowing from any suitable source of current, not shown. Immediately below the beveled edges of the poles 12 and 13 rotatable armatures 16 and 17 are disposed below the top member of the conveyer 5 and a magnetic return path 18 is provided in close proximity to the armatures 16 and 17, by which the magnetic circuit from the electromagnet 14 is practically closed except through the air gaps between the beveled edges of the poles 12 and 13 and the armatures 16 and 17. Each of the armatures 16 and 17 is conformed as indicated in Fig. 10, and a means (not shown) is provided for rotating both of the armatures, as indicated by the arrows. In this manner a magnetic field of maximum intensity is produced below each of the poles 12 and 13 at a point transversely of the conveyer 5 where the web of the armature happens to be in vertical position, and, since this web is helically conformed, it will at once be understood that rotation of the armature causes this point of maximum intensity of field to move transversely of the conveyer along the beveled edge of the magnet pole. As a result, the magnetic field, which may be adjusted so that its points of maximum density are those required to separate from the mass of the substances being treated the magnetic particles, serves to attract such magnetic particles to the under side of the corresponding non-magnetic shield and move the particles along the under surface of the shield as the point of maximum field progresses transversely of the conveyer. In this manner magnetic particles are moved to the end of the shield, which may continue beyond the corresponding magnet pole to deliver the magnetic particles beyond the range of magnetic action, or, as indicated in Fig. 3, the particles may be delivered onto the under surface of a rotary disk 19 rotated by inductive action produced by the corresponding armature, the particles being caused to remain in place upon the under side of such disk until rotated to a position away from the corresponding pole, in which position they are dropped from the disk. Other particles than the magnetic particles are also subject to the action of the armatures as follows: Any particles of electrically conductive material which may be in the substance being treated have produced in them, by the changing magnetic flux through them, electric currents which, under the action of the magnetic field in which they are located, are repelled by such field. As the field inducing the currents in these particles is moving or progressing transversely of the conveyer 5, it follows that the particles thus having electric currents induced in them are continuously subject to a thrust which moves them laterally of the conveyer 5 and delivers them from the end of the shield 10 or 11, as the case may be, in much the manner that the magnetic particles are delivered from the separator. The disk 19 is mounted upon a spindle 20, so that it is free to revolve and is made of conductive material, as a result of which the varying magnetic field caused to flow through it by rotation of the corresponding armature induces electric currents in it, which by repulsion against the magnetic field causes rotation of the disk 19.

In the modification shown in Fig. 2, the construction is much the same as that used in Fig. 1, with the exception that each of the armatures 16$^a$ and 17$^a$ is provided with an energizing winding, as a result of which the magnetic field is intensified for one position of each of said armatures and diminished for an opposite position of a corresponding armature, the construction shown being for a two pole armature arrangement. For the construction shown in Fig. 2, it is necessary to employ slip rings 21 and 22 upon the armature shaft 23 so that the brushes 24 and 25 connected with suitable feed wires, as indicated, may constantly supply current to the armature windings to maintain the edges of the armature core of the same polarity. It will be observed that the armature constructed as described will have no continuous rotary tendency and that, therefore, an auxiliary means must be provided to rotate it, which, as shown in Fig. 3, consists in a pulley 26 secured to the shaft 23, which is driven by means of a belt 27. It is preferable that the core of each armature be conformed so that it will constitute a helix having a complete turn in the length of the pole face, since this arrangement balances the magnetic effects of attraction and repulsion and decreases the amount of power required to rotate the armature to a minimum.

In the modification shown in Fig. 4, the arrangement is similar to that shown in Figs. 1 and 2, with the exception that the return path 18 is replaced by a second electromagnet 18$^b$, the energizing winding 18$^c$ of which is so connected in circuit that the poles of the magnet 18$^b$ are opposite in sign to the corresponding poles of the magnet 14$^b$. It is to be observed that the windings on the armatures 16$^a$ and 17$^a$ produce a twofold strengthening effect upon the magnetic field, in that, in the first place, when the armature windings act additively they increase the field strength through the points of maximum field, and that at the same time the portions of the core which are in reverse position increase the reluctance at the points of minimum magnetic flux, so that the magneto-motive force of the electromagnet 14$^a$ is concentrated upon the points of maximum field density.

In the modification shown in Figs. 5, 6 and 7, the mechanism is adapted for use in connection with a liquid carrier, by which the substance to be treated is carried under the magnetic poles in much the same manner as it is carried in Figs. 1 to 4 inclusive by the endless conveyer 5, the difference being that in the modification shown in Figs. 5 to 7 inclusive the substance to be treated is held more or less in suspension, which for certain kinds of material greatly facilitates the separation of the magnetic and inductive particles from the mass of the substance. In this modification the electromagnet 14$^d$ is similar to that shown and described above, as are the armatures 16$^c$ and 17$^c$. In this modification, a hopper 28 is provided for receiving the material to be treated, which drops through a sieve 29 in the bottom of the hopper into the open top of a tank 30, containing a suitable liquid for conveying the material through the flat tube 31 of non-magnetic material between the poles of the magnet 14$^d$ and the armatures 16$^c$ and 17$^c$. A screen 32 is provided in the tank 30 below the bottom of the tube 31 to prevent the larger particles of the pulverized material from passing into the bottom of the tank, and the liquid is maintained at about the level indicated from a suitable supply pipe 33 by a controlling valve 34. A pump plunger 35, vertically reciprocable in a cylinder 36, is operated by an eccentric 37 carried by a revolving shaft 38 to impart pulsations to the liquid contained in the tank 30, and these pulsations serve to agitate the particles of material held in suspension by the liquid and to cause the flow of the liquid and such particles through the tube 31. The poles of the electromagnet 14$^d$ carry at the ends from which the magnetic and inductive particles are delivered tapered magnetic pole ends 12$^d$ and 13$^d$, which are so conformed as to gradually diminish the field through the tube 31, as a result of which the magnetic and inductive particles are moved in the liquid transversely of the tube 31 until they reach a point under the pole ends 12$^d$ and 13$^d$ where the magnetic field is insufficient to further control them, at which point they are released from the magnetic action and pass with the flowing liquid into the tank 39 provided at the side of the delivery end of the tube 31. A partition 31ª is located in the tube 31 between the poles of the electromagnet 14ᵈ, to prevent the material being treated passing sidewise in the tube 31, between said poles, due to the pulsations imparted to the liquid. The armatures 16ᶜ and 17ᶜ are continued to the ends of the pole ends 12ᵈ and 13ᵈ. A common overflow or discharge spout 40 is provided for the delivery end of the tube 31 and the tank 39, as a result of which the unaffected portion of the material treated is delivered with the liquid in line with the electromagnet 14ᵈ since it has not been diverted into line with the receiving tank 39. The contents of the tank 39 may be drawn off from time to time by means of a stopper 41.

To facilitate the operation of the disk 19, an arrangement may be employed, which is indicated in Figs. 8 and 9, consisting in a pole end 42 of magnetic material secured to the end of the pole 12. This pole end is so conformed that the separated particles are carried well on to the disk 19 before the field strength is reduced to a point releasing them from its action, and in this manner the point of release may be controlled so that the separated particles may be delivered at a desired point. The shaft 20 is preferably of non-magnetic metal, as bronze, and mounted in bearings having anti-friction lining, as graphite. If desired, the disk 19 may be driven by power instead of by inductive action as described above. Collars 20ª carried by the shaft 20 provide a convenient means for adjusting the disk 19 in its bearings and retaining it in any desired adjustment. If desired, the armatures may have more than two poles, as indicated for the armature 16ᵈ in Fig. 11, which illustrates a six pole arrangement. A section of this armature is shown in Fig. 14. In the enlarged detail shown in Fig. 16, the armature winding is shown as held in place by means of non-magnetic shields 43 secured to one of the pole ends by means of screws 44. The shields 43 not only serve to hold the winding in place upon the armature pole, but also to reduce the effective area of the pole edges presented to the under side of the conveyer, thus serving to intensify the field at points of greatest density.

While I do not restrict my invention to any particular use, it is specially adapted for the magnetic separation of magnetic iron ore from sand or other non-ferruginous material, which is first comminuted or pulverized to the proper degree to make the separation possible and then fed through the mechanism, as described above. The amount of current used and the intensity of magnetic field produced are determined by the nature of the magnetic or other particles it is desired to separate from the mass.

To further adapt the mechanism to varying conditions, the magnet 14 may be adjusted toward or away from the conveyer 5 by loosening the supporting bolts 45 and 46 and moving the magnet vertically relatively to the brackets 47 and 48 by which the magnet is supported from the framework 49. Other metallic or mineral substances which are not magnetic, but which to a greater or less degree are conductors of electricity, may be removed by the mechanism described above by the inductive action of the moving magnetic field upon such conducting particles, and for this separation, as in the case of the separation of magnetic particles from the mass, the magnetic field may be given an intensity which will produce the most advantageous condition of inductive action for the particular material to be removed from the mass. For particles which are comparatively good conductors a relatively low magnetic density of field is sufficient, while for particles which are relatively poor conductors the intensity of magnetic field must be increased.

By the means pointed out above, I have found it practicable to separate a wide variety of substances from the sand or dirt with which they are mixed, as, for instance, the various oxids of iron, garnet, pyrrhotite and menachanite. These, and other similar substances, I find it frequently desirable to separate from the mass of sand and dirt by successive treatments, each treatment being adapted to separate a single substance from the remaining substances and the non-magnetic and inductive mass. By this means, the magnetite is first removed and then the menachanite, the pyrrhotite and garnet in the order named. For some substances it is also desirable to adapt the speed of the revolving armatures to the nature of the substances and the size of the crushed particles, so that the magnetic field produced may have the proper opportunity to magnetically or inductively affect the particles to be removed. In any event, and whatever the material to be removed may be, it is an essential characteristic of my invention that a moving or wandering field be produced in a direction different from the line of travel of the pulverized or comminuted material being treated; also that the magnetic conditions to which the material is subjected may be readily changed to suit the particular substance or substances to be removed, either by changing the current flow, changing the position of the field producing magnet, or changing the rate of rotation of the armature, or by combining these changes. The shape of the pole ends may also be changed to meet different operating conditions.

While I have shown my invention in the particular embodiment herein described it will, of course, be understood that other constructions may be employed for accomplishing the same or similar results without departing from the spirit of my invention.

What I claim is:

1. In a magnetic and inductive separator, the combination of an electromagnet, means for moving material to be treated under the magnet, a revolving armature in the magnetic field produced by the electromagnet and adapted to produce waves in the field flowing in a direction different from that taken by the material being treated in passing through the separator, and means for preventing the material from making contact with the revolving armature.

2. In a magnetic and inductive separator, the combination of an electromagnet, means for directing material to be treated adjacent to the poles of the electromagnet, devices for directing the magnetic field produced through the material treated, a revolving armature having helically-shaped poles located in the path of the flux from the magnet and means for preventing the material from making contact with the revolving armature.

3. In a magnetic and inductive separator, the combination of an electromagnet, means for directing material to be treated adjacent to the poles of the electromagnet, devices for directing the magnetic field produced through the material treated, a revolving armature having helically-shaped poles located in the path of the flux from the magnet, and shields of non-conducting material between the poles of the electromagnet and the material being treated.

4. In a magnetic and inductive separator, the combination of means for moving the material to be treated through the separator, a direct current electromagnet having its poles adjacent to said material moving means, means for distorting the magnetic flux produced through said material to produce magnetic waves flowing in a direction different from the motion of the material through the separator and means for preventing the material from making contact with said poles.

5. In a magnetic and inductive separator, the combination of means for moving the material to be treated through the separator, a direct current electromagnet having its poles adjacent to said material moving means, means for distorting the magnetic flux produced through said material to produce magnetic waves flowing in a direction different from the motion of the material through the separator, said pole pieces presenting tapered edges to the material treated and means for preventing the material from making contact with said poles.

6. In a magnetic and inductive separator, the combination of means for directing the material to be treated through the separator, a direct current electromagnet having its poles adjacent to said material moving means, means for distorting the magnetic flux produced through said material to produce magnetic waves flowing in a direction different from the motion of the material through the separator, and shields to prevent the material from making contact with said poles, said pole pieces having tapering end pieces for gradually decreasing the density of flux through the material treated and serving to keep the material centrally upon said shields.

7. In a magnetic and inductive separator, the combination of means for moving the material to be treated through the separator, a direct current electromagnet having its poles adjacent to said material moving means, means for distorting the magnetic flux produced through said material to produce magnetic waves flowing in a direction different from the motion of the material through the separator, and non-conducting shields on said pole pieces between the pole pieces and the material treated.

8. In a magnetic and inductive separator, the combination of means for moving the material to be treated through the separator, a direct current electromagnet having its poles adjacent to said material moving means, means for distorting the magnetic flux produced through said material to produce magnetic waves flowing in a direction different from the motion of the material through the separator, supporting connections for the parts permitting adjustment of the air gaps in the magnetic circuit as desired and means for preventing the material from making contact with said poles.

9. In a magnetic and inductive separator, the combination of means for moving the material to be treated through the separator, a direct current electromagnet having its poles adjacent to said material moving means, a revoluble armature having helical poles for distorting the magnetic flux produced through said material to produce magnetic waves flowing in a direction different from the motion of the material through the separator and means for preventing the material from making contact with the revolving armature.

10. In a magnetic and inductive separator, the combination of means for moving the material to be treated through the separator, a direct current electromagnet having its poles adjacent to said material moving means, a revoluble armature having helical poles for distorting the magnetic flux produced through said material to produce magnetic waves flowing in a direction different from the motion of the material through the separator, windings on the armature for exciting its pole pieces and means for preventing the material from making contact with the revolving armature.

11. In a magnetic and inductive separator, the combination of means for moving the material to be treated through the separator, a direct current electromagnet having its poles adjacent to said material moving means, means for distorting the magnetic flux produced through said material to produce magnetic waves flowing in a direction different from the motion of the material through the separator, and a rotary disk adapted to be rotated by induction by said waves and supported adjacent to one of the pole ends for receiving and removing the particles separated from the mass.

12. In a magnetic and inductive separator, the combination of means for directing the material to be treated through the machine, an electromagnet having its poles disposed adjacent to the directing means on one side thereof, means establishing a magnetic return path for the magnet on the other side of the directing means, and a revoluble armature having helically-shaped pole pieces located adjacent to the directing means in the magnetic return path.

13. In a magnetic and inductive separator, the combination of means for directing the material to be treated through the machine, an electromagnet having its poles disposed adjacent to the directing means on one side thereof, means establishing a magnetic return path for the magnet on the other side of the directing means, a revoluble armature having helically-shaped pole pieces located adjacent to the directing means in the magnetic return path, and a winding or windings on the armature for energizing its pole pieces.

14. In a magnetic and inductive separator, the combination of means for directing the material to be treated through the machine, an electromagnet having its poles disposed adjacent to the directing means on one side thereof, means forming a magnetic return path for the magnet on the other side of the directing means, a revoluble armature having helically-shaped pole pieces located adjacent to the directing means in the magnetic return path, and a second electromagnet in the magnetic return path with its poles disposed relatively to said magnetic return path to assist the first-named electromagnet in establishing a waving magnetic field through the material treated by means of the revoluble armature.

15. In a magnetic and inductive separator, the combination of means for directing the material to be treated through the machine, an electromagnet having its poles disposed adjacent to the directing means on one side thereof, means forming a magnetic return path for the magnet on the other side of the directing means, a revoluble armature having helically-shaped pole pieces located adjacent to the directing means in the magnetic return path, a winding or windings on the armature for energizing its pole pieces, and shields of non-conductive material disposed between the poles of the electro-magnet and the material being treated.

16. In a magnetic and inductive separator, the combination of material directing mechanism, a separating magnet disposed in proximity to said material directing mechanism, means for advancing the material to the side of the magnet, and a rotary disk adapted to be operated by magnetic induction for receiving the material and delivering it from the separator.

17. In a magnetic and inductive separator, the combination of means for directing the material to be treated through the separator, a direct current electromagnet having its poles adjacent to the material directing means, a revoluble armature having helical poles for distorting the magnetic flux produced through said material to produce magnetic waves flowing in a direction different from the motion of the material through the separator, said helical poles making one or more complete turns in the length of the corresponding magnet pole and means for preventing the material from making contact with the revoluble armature.

18. In a magnetic and inductive separator, the combination of material directing mechanism, a separating magnet disposed in proximity to said material directing mechanism, a shield for preventing contact between the material and the magnet, means for advancing material toward one end of the shield, and a revoluble disk having its edge disposed between said end of the shield and the magnet to receive the material from the shield.

19. In a magnetic and inductive separator, the combination of material directing mechanism, a separating magnet disposed in proximity to said material directing mechanism, a shield for preventing contact between the material and the magnet, means for advancing material toward one end of the shield, and a revoluble disk adapted to be operated by magnetic induction and having its edge disposed between said end of the shield and the magnet to receive the material from the shield.

20. In a magnetic and inductive separator, the combination of material directing mechanism, a separating magnet having a pole disposed in proximity to said material directing mechanism, means for advancing the material toward one extremity of the pole piece, a revoluble disk adapted to be operated by magnetic induction having its edge disposed adjacent to said extremity, and a member extending from said pole adjacent to the disk for producing a gradually decreasing field through the disk to assist in rotating the disk by said inductive action.

21. In a magnetic and inductive separator, the combination of material directing mechanism, a separating magnet having a pole disposed in proximity to said material directing mechanism, means for advancing the material toward one extremity of said pole, a shield located between the material directing mechanism and said pole, a revoluble disk having its edge disposed between said extremity and said shield, and a member extending from said magnet pole adjacent to the disk for producing a gradually decreasing field through the disk.

22. In a separator for mingled particles, the combination of mechanism for directing the material to be treated through the machine, and devices for producing through said material an undulating uni-directional magnetic field having a direction of progression transversely of the direction of motion of said material through the separator for moving conductive particles of said material transversely from the influence of said directing mechanism.

23. In a separator for mingled particles, the combination of mechanism for directing the material to be treated through the machine, a direct current electromaget for producing a magnetic field through said material, and devices for producing through said material an undulating magnetic field having a direction of progression transversely of the direction of motion of said material through the separator for moving conductive particles of said material transversely from the influence of said directing mechanism.

24. In a separator for mingled particles, the combination of mechanism for directing the material to be treated through the machine, a non-magnetic surface adjacent to the path of said material, and means for producing an undulating uni-directional magnetic flux through said material and said surface to produce motion of conductive particles of said material upon said surface.

25. In a separator for mingled particles, the combination of mechanism for directing the material to be treated through the machine, a non-magnetic surface adjacent to the path of said material, and means for producing an undulating uni-directional magnetic flux through said material and said surface to produce motion of conductive particles of said material upon said surface, the direction of motion of said conductive particles being in a different direction from the direction of motion of the mingled particles through the separator.

26. In a separator for mingled particles, the combination of mechanism for directing the material to be treated through the machine, a non-magnetic surface adjacent to the path of said material, and a direct current electromagnet for producing an undulating magnetic flux through said material and said surface to produce motion of conductive particles of said material upon said surface.

27. In a separator for mingled particles, the combination of mechanism for directing the material to be treated through the machine, a non-magnetic surface adjacent to the path of said material, and a direct current electromagnet for producing an undulating magnetic flux through said material and said surface to produce motion of conductive particles of said material upon said surface, the direction of motion of said conductive particles being in a different direction from the direction of motion of the mingled particles through the separator.

In witness whereof, I hereunto subscribe my name this 12th day of September, A. D. 1911.

SAMUEL W. OSGOOD.

Witnesses:
ALBERT C. BELL,
LEONARD E. BOGUE.